July 9, 1968 W. M. ROSS 3,392,404
ELECTRIC DISCHARGE RECORDING STYLUS
Filed April 6, 1967
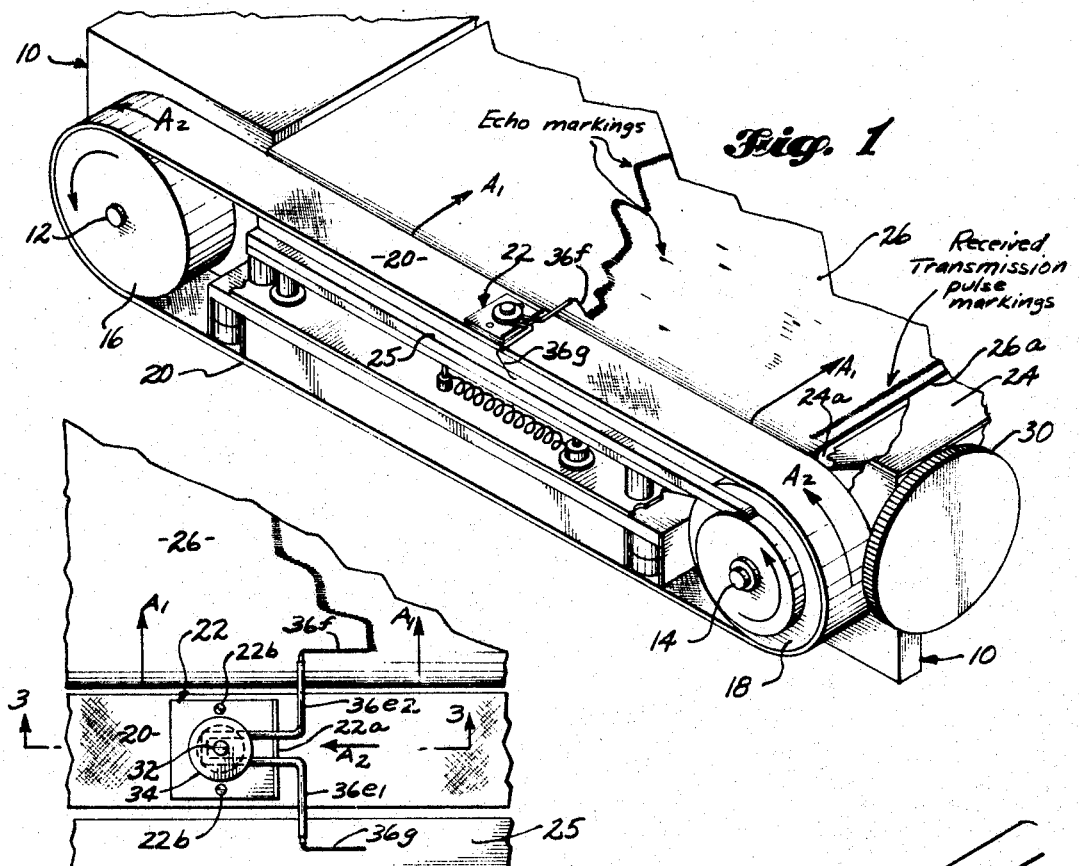
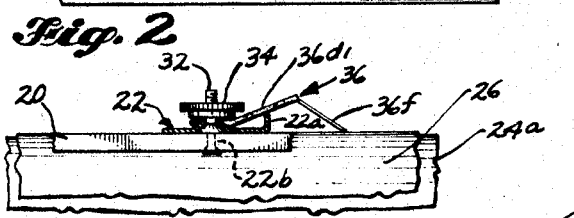
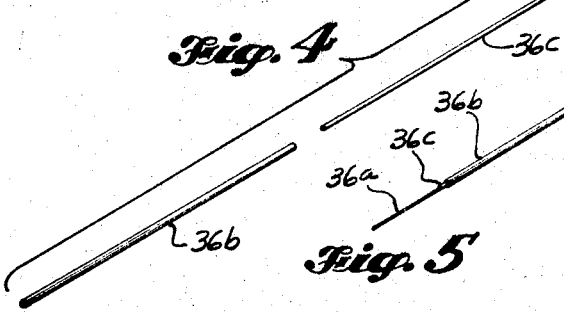
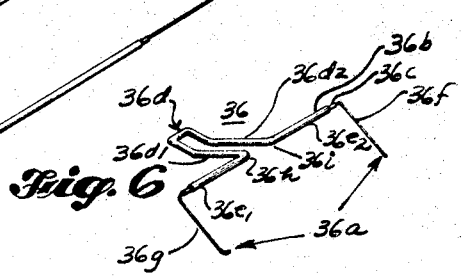
INVENTOR.
WAYNE M. ROSS
BY
ATTORNEYS

United States Patent Office 3,392,404
Patented July 9, 1968

3,392,404
ELECTRIC DISCHARGE RECORDING STYLUS
Wayne M. Ross, Seattle, Wash., assignor to Ross Laboratories, Inc., Seattle, Wash., a corporation of Washington
Filed Apr. 6, 1967, Ser. No. 628,893
7 Claims. (Cl. 346—139)

ABSTRACT OF THE DISCLOSURE

Steady stylus pressure on the recording paper in sonar indicators or similar devices is achieved by the improved stylus unit wherein a length of resilient wire anti-rotationally held at one point along a wire holder passage extends from that point through the adjacent portion of the passage and out the end thereof where it bends transversely to form a stylus arm projecting into contact with the recording surface. The intervening length of wire derives rotational guidance and support from the holder so as to function as a torsion bar adding greatly to the capacity of the stylus arm to deflect with minimal change of contact pressure on the recording surface even after considerable shortening of the stylus arm through wear.

Description

This invention relates to improved stylus devices for sonar recorders and similar applications wherein the stylus is swept repeatedly across an electrically sensitive paper strip advancing progressively in a direction at right angles to the line of sweep. The invention is herein illustratively described by reference to the presently preferred embodiment thereof; however, it will be recognized that certain modifications and changes therein with respect to details may be made without departing from the essential features involved.

In order to utilize the full width of the recording paper and record with consistent or related intensity all signals returning to the sonar receiver during the entire range interval commencing with pulse transmission, it is essential that the stylus be and remain in steady contact with the recording paper during most all of its entire recording sweep from edge to edge of the paper. An obstacle to achieving this result heretofore has been inadequacy of the stylus design to tolerate carrier belt whip or undulations and stylus transients (chatter) attending its passage over the incident edge of the paper. An important object of this invention is to fulfill these requirements, and more particularly to do so in a recorder of the type employing an endless belt for the carrier.

Another object hereof is to provide such a stylus efficient and stable in its operation over a long useful life. In this regard the improved stylus retains substantially full flexibility and resilient pressure on the recording paper even after a substantial shortening of the stylus arm through wear.

Still another object is to provide a simplified combined stylus and associated electrode wiper construction achieving the previously-mentioned advantages and also affording a convenient means of detachably mounting the stylus on a carrier.

In accordance with features of this invention, the recording stylus element comprises an elongated thin resilient wire which projects transversely as a lever arm from the open end of a tubular cantilever support or holder through which a portion of the wire passes to derive rotational support and guidance from the holder. Anti-rotational engagement between the wire and the holder at a location spaced inwardly from the open end of the holder permits the guided portion of the wire to function as a torsion bar greatly enhancing the capacity of the stylus element to flex over a range with minimal change of stylus pressure, even after much shortening of the stylus arm through wear.

As a further feature, both end portions of the wire extend as torsion bar elements through the respective aligned end portions of the holder tube and project transversely therefrom, one into contact with the paper and the other into contact with an electrode bar for transmitting amplified sonar signals to the stylus element. Forming of the intermediate portion of the holder tube and wire assembly into a U-shaped configuration provides the anti-rotational engagement between the wire and the holder tube and at the same time a convenient mounting means for detachable securement of the stylus unit on a carrier.

These and other features, objects and advantages of the invention will become more fully evident from the following description thereof by reference to the accompanying drawings.

FIGURE 1 is a perspective view of an end portion of a recording indicator incorporating the improved stylus construction;

FIGURE 2 is a fragmentary top view of the recorder illustrating the stylus and associated preferred type of carrier mounting;

FIGURE 3 is a transverse sectional view taken on line 3—3 in FIGURE 2;

FIGURE 4 is an exploded view of the stylus assembly elements prior to assembly thereof;

FIGURE 5 is a view of the elements assembled prior to bending of the stylus wire and holder tube to their final configuration; and FIGURE 6 is a perspective view of the improved stylus assembly in its final configuration ready for attachment to the carrier mount.

Referring to the drawings, the recording indicator illustrated in FIGURES 1, 2 and 3 is or may be of a known or commercially available form. Only those portions thereof which are particularly relevant to an understanding of the nature and function of the improved stylus will be mentioned in the description which follows herein. As shown, the recorder comprises a base or chassis 10 upon one end of which shafts 12 and 14 project in transversely spaced parallel relationship to support the respective sheaves or drums 16 and 18 encircled by a continuously driven endless, stylus carrier belt 20. The upper straight stretch of this belt defines the recording sweep line of the stylus to be carried by the belt. The preferred mounting bracket 22 for the stylus comprises a flat metal plate secured to the belt by transversely aligned rivets or similar elements 22b, such plate having an upturned low flange 22a oriented transversely of the belt. The recorder device has an electrically conductive (grounded) flat table surface 24 disposed approximately in the plane of the upper stretch of belt 20 and having a straight terminal edge 24a extending along one edge of the upper stretch of belt. In cross section the edge 24a is rounded and smooth so as to guide a strip of electrically sensitive recording paper 26 around such edge as the paper is advanced by suitable means (not shown) over the conductive surface 24 in the direction of arrows A1, A1 at right angles to the edge 24a. Suitable supply and take-up rolls and drive means for the paper strip are provided in the usual manner but these are or may be conventional and are therefore not illustrated.

A straight conductive bar 25 electrically insulated from the chassis 10 and particularly from the conductive ground table 24 extends along the opposite edge of the upper stretch of belt 20 and is connected electrically by means (not shown) to the output of the sonar receiver (not shown) so as to deliver the amplified received impulses from the receiver for application to the recording stylus during its sweep across the recording paper.

The stylus carrier belt 20 is driven in the direction of the arrows A2, A2 by an electric motor (not shown) connected to one of the shafts 12 or 14. A knob 30 turns a screw device (not shown) which may be used to vary the distance between the shafts 12 and 14 in order to establish the desired tension in the belt. Suitable means (not shown) are provided which, in the usual mode of operation of the sonar system, triggers the sonar transmitter each time the stylus carrier 22 passes over the incident edge 26a of the recording paper so as to initiate the range interval of the sonar and the recording sweep of the indicator at substantially the same instant.

Carrier plate 22 has a central aperture around the rim of which the metal projects upwardly in conical form to accommodate in the space beneath it the head of a stud screw 32 projecting upwardly from the belt. A serrated thumb nut 34 is threaded on the screw 32 and serves as a releasable clamp or hold-down for the stylus device 36 mounted on the carrier plate 22 in the manner illustrated and to be described.

The illustrated stylus device 36 comprises an elongated resilient wire 36a passed through a holder tube 36b shorter in length than the wire and preferably separated from the interior wall of the holder tube 36b by a shim tube 36c of approximately the same length as the holder tube 36b. The use of a shim tube 36c permits the wire to be as small as desired for the purpose of fine-line recording while permitting the holder tube 36b to be much larger and of stock material low in cost and of adequate stiffness and strength for the purpose. Initially the tubes and wire are straight in form as shown in FIGURES 4 and 5 and when assembled appear as in FIGURE 5 with the ends of the wire projecting symmetrically beyond the ends of the tubes. The wire is slightly smaller in cross section than the interior cross section of the shim tube 36c.

With the stylus elements assembled together as in FIGURE 5 their intermediate portion is formed into a generally U-shaped configuration with the base portion of the U being of a size to seat around the upstruck conical part of the carrier 22 and so as to accommodate the head of stud 32 within the U. In this position the stylus may be clamped by the thumb nut 34 against the top face of the carrier plate 22 as shown in FIGURE 3.

Preferably the U-shaped configuration 36d has parallel leg portions 36d1 and 36d2 lying in a plane which is angled slightly to the plane of the base portion of the U configuration, thereby permitting these leg portions to angle upwardly and rest upon the top edge of the flange 22a. The holder tube's opposite end portions 36e1 and 36e2 are directed oppositely on a common line in symmetrical relationship parallel to the supporting edge of flange 22a so as to provide laterally extending cantilever arm supports for the projecting end portions 36f and 36g of the stylus wire 36a, elevated above the plane of the paper 26 and the corresponding plane of the top of the conductive contact bar 25. Beyond the respective ends of the holder tube 36b the wire 36a is bent transversely to the aligned ends of the tube so as to form arms which extend downwardly therefrom at an incline, the arm 36f to contact recording paper 26f and the arm 36g to contact the electrode bar 25.

Within the shim tube 36c the stylus wire is rotatively supported along the substantially straight extent of each of the holder tube arm portions 36e1 and 36e2 holding the same. However, at the bends in the tube, designated 36h and 36i, where the U-shaped configuration is formed in the assembled elements, the presence of these bends provides anti-rotational engagement between the holder tube and the wire. Thus the stretches of wire extending outwardly from the points at which these bends occur to the respective ends of the holder tube serve as elongated torsion bar resilient supports for each of the stylus arms 36f and 36g. The capacity of these torsion bars to flex resiliently, when the stylus arms deflect, imparts resilient flexibility and long useful life to the stylus enabling it to perform efficiently and consistently despite shortening of the arms by wear.

The improved stylus when mounted in a recorder as in the manner depicted in FIGURE 3 provides a convenient, reliable, durable and low-cost means of applying electrical impulses to recording paper.

These and other aspects of the invention will be evident to those skilled in the art on the basis of the foregoing disclosure on the presently preferred embodiments thereof.

I claim as my invention:

1. An electrical contact stylus adapted to be carrier-mounted for relative movement along a line of contact with a surface, said stylus comprising an elongated resilient contactor wire, a holder having an elongated passage therein at least a portion of which extends substantially straight along an axis to an open end, a portion of said wire being rotatively retained in said straight portion and projecting outwardly through said open end, thence through a bend and in a direction transverse to said axis for contacting the surface, and means including the holder anti-rotationally engaging the wire at a location along the wire remote from said bend while permitting wire rotation in the passage outwardly from said location, said holder being adapted for mounting thereof on a carrier.

2. The stylus defined in claim 1, wherein the holder comprises an elongated tubular member, and wherein said means comprises, beyond said straight portion, a bend in the tubular member and, within it, the wire.

3. The stylus defined in claim 2, wherein the holder additionally comprises a tubular journal shim surrounding the wire in said straight portion.

4. The stylus defined in claim 2, wherein the bend in the tubular member and wire forms a substantially U-shaped configuration adapting the stylus to pass and be clampingly held by securing means of a stylus carrier.

5. The electrical contact stylus defined in claim 4, wherein the tubular member and wire, beyond the bend therein, extend conjointly in a second substantially straight portion substantially aligned with the first and which second straight portion of the tubular member extends to the end thereof opposite the first-mentioned end, with the wire being rotatively retained in said second straight portion of the tubular member and projecting outwardly therefrom, thence through a bend and in a direction generally parallel to said first-mentioned transverse direction, for contacting a separate conductive surface along a line parallel to said first line.

6. The electrical contact stylus defined in claim 5, wherein the U-shaped configuration comprises a base portion lying in one plane and leg portions projecting from said base portion in a plane angled to the first plane.

7. The electrical contact stylus defined in claim 2, wherein the tubular member and wire, beyond the bend therein, extend conjointly in a second substantially straight portion substantially aligned with the first and which second straight portion of the tubular member extends to the end thereof opposite the first-mentioned end, with the wire being rotatively retained in said second straight portion of the tubular member and projecting outwardly therefrom, thence through a bend and in a direction generally parallel to said first-mentioned transverse direction, for contacting a separate conductive surface along a line parallel to said first line.

References Cited

UNITED STATES PATENTS 2,633,405  3/1953  Nelson _____ 346—139
3,108,845  10/1963  Zabriskie _____ 346—139

RICHARD B. WILKINSON, *Primary Eaximner.*

JOSEPH W. HARTARY, *Assistant Examiner.*